United States Patent [19]

Delsarte

[11] 4,186,155

[45] Jan. 29, 1980

[54] METHOD FOR THE MANUFACTURE OF GRAFT COPOLYMERS

[75] Inventor: Jacques Delsarte, Villers Saint Sepulcre, France

[73] Assignee: Produits Chimiques Ugine Kuhlmann, Courbevoie, France

[21] Appl. No.: 917,418

[22] Filed: Jun. 21, 1978

[30] Foreign Application Priority Data

Jul. 12, 1977 [FR] France ............................... 77 21435

[51] Int. Cl.$^2$ .................... C08F 279/02; C08F 279/04
[52] U.S. Cl. ......................................... 525/78; 525/86
[58] Field of Search ......................... 536/880 R, 876 R

[56] References Cited

U.S. PATENT DOCUMENTS

| | | | |
|---|---|---|---|
| 3,370,105 | 2/1968 | DeBell | 260/880 R |
| 3,436,440 | 4/1969 | Abe et al. | 260/880 R |
| 3,887,652 | 6/1975 | Carrock et al. | 260/880 R |
| 4,011,283 | 3/1977 | Sturt | 260/880 R |

FOREIGN PATENT DOCUMENTS 2233365 11/1975 France.
2304645 10/1976 France.
2319651 2/1977 France.

*Primary Examiner*—William F. Hamrock
*Attorney, Agent, or Firm*—Sigalos & Levine

[57] ABSTRACT

The present invention relates to the method for the manufacture of graft copolymers by the polymerization of a monomeric mixture comprising at least one aromatic vinyl derivative monomer and at least one acrylic or methacrylic derivative monomer in the presence of a graftable monodimensional elastomer latex, comprising the steps of first carrying out the polymerization under aqueous emulsion polymerization conditions in the presence of an initial amount of a first monodimensional elastomer latex being the major portion of the latex entering into the composition of the graft copolymer until the xy/z ratio is greater than 30%; x being the total parts by weight of said monomers, y the conversion coefficient of said monomers expressed in percent of total amount, and z the total amount of elastomer expressed in parts by weight of dry solids, and thereafter adding the remaining amount of a second monodimensional elastomer latex and completing the polymerization reaction under suspension polymerization conditions.

14 Claims, No Drawings

METHOD FOR THE MANUFACTURE OF GRAFT COPOLYMERS

BACKGROUND OF THE INVENTION

Among the known methods of polymerization grafting of ethylenically unsaturated monomers onto elastomer skeletons which can be grafted, the so called "aqueous emulsion method" is satisfactory only in the case in which the latexes used for grafting are polydispersed. When this same procedure is applied to monodimensional elastomer latexes, products are obtained whose hot fluidity (flow) and surface appearance may be satisfactory, but whose shock resistance is mediocre. Other known methods described, in particular in U.S. Pat. Nos. 3,370,105 and 3,436,440 and in French Pat. Nos. 2,233,365 and 2,304,645, consist in placing graftable elastomer latexes into suspension. These known methods make it possible to obtain products whose shock resistance is high and whose hot fluidity (flow) can likewise be good, but whose hardness and tensile strength are low and, above all, whose surface appearance is mediocre. It has heretofore not been possible to obtain graft polymers whose mechanical properties and surface properties are entirely satisfactory.

SUMMARY OF THE INVENTION

The present invention provides the advantages of the methods of polymerization in emulsion and in suspension without suffering their drawbacks and makes it possible to manufacture products of excellent quality as far as both the mechanical properties and the surface appearance are concerned.

Briefly stated, the present invention comprises the method for the manufacture of graft copolymers by the polymerization of a monomeric mxiture comprising at least one aromatic vinyl derivative monomer and at least one acrylic or methacrylic derivative monomer in the presence of a graftable monodimensional elastomer latex, comprising the steps of first carrying out the polymerization under aqueous emulsion polymerization conditions in the presence of an initial amount of a first monodimensional elastomer latex being the major portion of the latex entering into the composition of the graft copolymer until the xy/z ratio is greater than 30% x being the total parts by weight of said monomers, y the conversion coefficient of said monomers expressed in percent of total amount, and z the total amount of elastomer expressed in parts by weight of dry solids, and thereafter adding the remaining amount of a second monodimensional elastomer latex and completing the polymerization reaction under suspension polymerization conditions.

DETAILED DESCRIPTION

The method is characterized by the fact that in a first stage a mixture of monomers composed of at least one aromatic vinyl derivative and at least one acrylic or methacrylic derivative is polymerized in aqueous emulsion, in the presence of a monodimensional elastomer latex containing ethylenic double bonds, until the ratio of xy/z is greater than 30% and preferably greater than 40% with x being the parts by weight of said monomers, y being the conversion coefficient of the introduced monomers expressed in percent of the total amount, and z being the quantity of elastomer expressed in parts by weight of dry solids, and by the fact that after a new addition of complementary monodimensional latex, the reaction is completed in a second stage by suspension polymerization.

The monodimensional latexes which can be used according to the invention possess the characteristics of having an extremely narrow granulometric distribution, with the mean diameter of the particles ranging between 300 and 3,000 Angstroms and preferably between 500 and 2,500 Angstroms. Such latexes are known per se and widely described in the literature. For example, a formulation for a latex of a styrene/butadiene copolymer of a 9/91 weight ratio is described by Whitby in "Synthetic Rubber" (1954)—Chapter 8, Emulsion Polymerization Systems (GF. FYLING), page 228.

In the first stage, called the emulsion polymerization stage, first 60 to 95% and preferably 70 to 90% of the total quantity of monodimensional latex entering into the composition of the graft copolymer is employed, with the remainder of the latex, called the complementary or second monodimensional latex, being added at the end of emulsion polymerization and after the desired xy/z ratio has been attained and prior to the stage in which the reactive medium is placed in suspension. This complementary monodimensional latex is not necessarily the same as the one which has been employed at the beginning of emulsion polymerization; the important factor being that it is a monodimensional latex of an elastomer which can be grafted. When the same latex is used, it is preferred that its gel ratio, determined in benzene, be from 80 to 95% for a swelling index of about 8 to 18. On the other hand, when a complementary monodimensional latex is used which is different from the one employed at the beginning of emulsion polymerization, it is preferred that its gel ratio be 40 to 80% and, better still, from 60 to 80%, for a swelling index of about 18 to 40. In the latter case, the latex employed at the beginning of emulsion generally possesses a gel ratio of 80 to 95% for a swelling index of about 8 to 18.

In order that the grafting at the emulsion stage be carried out under the best conditions and, in particular, without flocculate formation and without excessive clogging of the reactor, it is recommended that the latex be first stabilized rather than to introduce the emulsifier during the course of polymerization. The stabilization systems are those conventionally employed. They are, for example, soaps of fatty acids, alkyl and alkyl aryl sulfonates, salts of resin acids, and watersoluble polyoxyalkylenes. Among these systems, it is preferred to use the potassium salts or the sodium salts of lauric acid at the rate of 0.1 to 4 parts by weight for 100 parts by weight latex dry solids.

Generally speaking, all of the elastomers which possess a minimum unsaturation ratio of 3% by weight and occur in the form of monodimensional latex are suitable for the method which is the object of the invention. These elastomers are either homopolymers such as, for instance, polyisoprene, polychloroprene, polybutadiene or copolymers which, by way of illustration, can be copolymers with an ethylene, propylene or isobutylene base, or even styrene/butadiene copolymers or acrylonitrile/butadiene copolymers. Natural rubber is likewise suitable as the elastomer in the method of the invention. In general, the elastomers most generally utilized in the manufacture of copolymers according to the invention are the polybutadienes and the styrene/butadiene copolymers. When a styrene/butadiene copolymer is used, the styrene content customarily is below 20% by weight.

The entire amount of monomers, according to this invention, can be introduced during the stage of emulsion polymerization. They can be introduced separately or as a mixture of monomers, continuously, or discontinuously. A supplement of monomer can likewise be introduced at the end of emulsion polymerization when the desired ratio of xy/z has been attained.

Among the aromatic vinyl derivatives, or compounds, utilizable as monomers in the method, by way of example, are styrene, α-methyl styrene, and substituted styrenes such as o-methyl styrene, m-methyl styrene, p-methyl styrene, dimethyl styrenes, trimethyl styrenes, halogenated styrenes such as 2,5 dichlorostyrene, and mixtures thereof.

Among acrylic or methacrylic derivatives, or compounds, utilizable as monomers in the method, likewise by way of example, are acrylic and methacrylic acid, methyl acrylate, ethyl acrylate, ethyl acrylate, butyl acrylate, methyl methacrylate, ethyl methacrylate, butyl methacrylate, acrylonitrile, methacrylonitrile, and mixtures thereof.

One can possibly replace a part of one or more monomers of the mixture composed of an aromatic vinyl derivative and an acrylic or methacrylic derivative by a third monomer such as, for instance, vinyl chloride, a vinyl ester such as the acetate or propionate, or a vinyl ether such as ethyl vinyl ether.

The mixtures of styrene and of acrylonitrile are particularly suitable for use in the instant method. Customarily, in this case, the weight ratio of styrene to acrylonitrile ranges between 60/40 and 80/20 and preferably in the vicinity of 70/30 in such a way that the resin formed will have a composition close to the azeotropic composition. The styrene/methyl methacrylate mixture is just as suitable.

The instant method can be carried out in a reactor equipped with a temperature control system and an agitation system suitable for standard emulsion and suspension methods. The emulsion polymerization stage is carried out in the usual and known manner. The quantity of latex required for the manufacture of the graft polymer in the emulsion phase and the monomers are introduced into the reactor containing the quantity of water adequate for the reaction. As a variation, the monomers can be introduced uniformly during the course of the emulsion polymerization by means, for example, of a dosing pump. With the agitation being such that a good homogenization of the reaction medium is ensured, the temperature is kept between 20° and 100° C. and preferably between 40° C. and 80° C. The reaction is continued until the chosen xy/z ratio is attained. At this point, the complementary monodimensional latex is added, as well as a possible supplement of monomer, and then the suspension polymerization of the second stage is started by the introduction of a solution of protective colloids into the reaction medium. This suspension polymerization likewise takes place under the known conditions of agitation, temperature and reaction time conventionally employed in such polymerizations. The reaction temperature generally ranges between 40° and 150° C., preferably between 60° C. and 120° C. for a time sufficient for the complete polymerization of the monomers.

When the reaction is completed, the reactor is emptied. Then, after decantation, centrifugation, and drying, the copolymer is recovered in the form of beads. In general, the dried beads contain less than 0.1% of residual monomers.

The described method can likewise be carried out in other known ways. It is possible, for instance, to carry out the emulsion and suspension polymerizations in continuous manner in several reactors arranged in series.

All of the usual additives used in conventional and standard emulsion polymerization and suspension polymerizations can be used in the method of the invention. Thus, any of the usual initiators, chain transfer agents, catalysts, antioxidants, and lubricants known to those skilled in the art can be and are utilized in the emulsion polymerization stage of this invention. The same is true for the initiators, chain transfer agents, and protective colloids used in the suspension polymerization stage.

The initiators generally are of two types; water-soluble initiators traditionally effective in emulsion polymerization procedures and liposoluble initiators preferable in suspension polymerization procedures. Examples of initiators of emulsion polymerization are potassium persulfate, ammonium persulfate, sodium peroxide, hydrogen peroxide, azo compounds like azo-bis-isobutyronitrile or 2,2-azo-bis (2,4-dimethyl valeronitrile), and examples of initiators of suspension polymerization are peroxy dicarbonates like bis (4t-butyl cyclohexyl) peroxy dicarbonate, dicyclohexyl peroxy dicarbonate, bis (2-ethyl hexyl) peroxy dicarbonate, di-n butyl peroxy dicarbonate, diisopropyl peroxy dicarbonate; alkyl peroxides like lauroyl peroxide, decanoyl peroxide; aromatic peroxides like benzoyl peroxide; perpivalates like t-butyl perpivalate; perbenzoates like t-butyl perbenzoate; and peracetates like t-butyl peracetate.

The catalysts used preferably are potassium persulfate in the emulsion polymerization stage, and t-butyl perpivalate, lauroyl peroxide and di-t-butyl perbenzoate used singly or in combination in the suspension polymerization stage. These catalysts are not exclusive; all known catalysts for these types of polymerization being suitable in the instant method.

The utilization of chain transfer agents during the emulsion polymerization stage is recommended in order to improve the fluidity of the final graft copolymer. The best known chain transfer agents are linear or branched mercaptans, thioethers, the dimer of α-methyl styrene and certain olefin compounds.

The protective colloids used in the suspension polymerization stage can be any of well-known conventional compounds. These are, for example, hydroxyethyl cellulose, methyl cellulose, polyacrylic acid, polyacrylamide, carboxymethylcellulose, polyvinyl alcohol, some polyglycols, some gelatins, some water-soluble alginates, and mixtures thereof, with the preferred ones being hydroxyethyl cellulose and polyvinyl alcohol. Mineral agents can likewise be used, such as tricalcium phosphate for instance. They are generally employed in aqueous solution at a rate of 0.1 to 3 parts by weight for 100 parts by weight of copolymer to be manufactured.

It is desirable, but not indispensable, to add a lubricant to the reaction mixture prior to the suspension polymerization stage. These lubricants are standard and can be mixtures of paraffin wax and hydrocarbon oil, refined mineral oils, or even esters such as butyl stearate and dioctyl phthalate. They are used in quantities which can vary from 1 to 4 parts by weight for 100 parts by weight of graft copolymer.

The method according to the invention makes it possible to manufacture graft copolymers containing 10 to 70% by weight, and preferably 40 to 60% by weight, of elastomer.

The graft copolymers containing 40 to 70% of elastomer in general have a very great resilience, and this makes it possible to commercialize graft copolymers of different characteristics prepared by the mixture, at different ratios, of the graft copolymer with other polymers or copolymers. Thus, these graft copolymers can be mixed with graft copolymers of polyvinyl chloride on various elastomers, with acrylonitrile/butadiene/styrene copolymers, with grafted copolymers of acrylonitrile and of styrene on elastomers having a low unsaturation ratio like the copolymers ethylene/propylene/diene monomer (EPDM) or the butyl or acrylic rubbers, and likewise with resins such as polyvinyl chloride, styrene/acrylonitrile resins and their derivatives. Such mixtures customarily have an elastomer content between 5 and 60% by weight and, more generally, between 10 and 40% by weight.

The method of this invention reduces the agglomeration of the graft latex in emulsion at the moment when it is being placed into suspension, and this produces the brightness of the final product. The new introduction of latex at the end of emulsion makes it possible to ensure the growth of a sufficient number of particles in order to guarantee that the final product will possess good mechanical properties, with the cohesion of the system being ensured by the graft polymerization in suspension of the remainder of the monomers.

This method has the advantage of being carried out beginning with monodimensional latexes. Up to the present time, it has not been possible to use monodimensional latexes to achieve a graft copolymer such as the final products hereof simultaneously exhibiting good mechanical properties, a good fluidity, and a suitable surface appearance. This advantage is of great interest, since it is well known that fine particle size monodimensional latexes can be manufactured easily and inexpensively.

The invention will be further described in connnection with the following examples which are given for purposes of illustration only. Also, in the examples, the mechanical properties are determined on mixtures of the graft copolymer with a copolymer, the different mixtures called in Examples 1 to 4:

Type 1: The graft copolymer of the example intimately mixed with a styrene/acrylonitrile copolymer containing 70% styrene by weight and 30% acrylonitrile by weight and having an intrinsic viscosity of 0.67 dl/g as measured in dimethyl formamide. The elastomer content amounts to 28% by weight based on the weight of the final mixture.

Type 2: Corresponds to Type 1, except that the elastomer content amounts to 13.5% by weight based on the weight of the final mixture.

Type 3: The graft copolymer of the example intimately mixed with an α-methyl styrene/acrylonitrile copolymer containing 69% α-methyl styrene by weight and 31% acrylonitrile by weight and having an intrinsic viscosity of 0.60 dl/g as measured in dimethyl formamide.

For determination of the mechanical properties the graft copolymers of the examples are mixed with the copolymer in an enclosed mixer. Mixing of the mass is continued in an open mixer and then the mass is granulated. The granules are injection molded by means of a screw press. The conditions of injection for each of the types are the following:

|  | Temperatures | Pressure in bars |
| --- | --- | --- |
| Type 1 | 180°–190° C. | 100 |
| Type 2 | 170°–180° C. | 90 |
| Type 3 | 200°–210° C. | 110 |

The measured properties are as follows:

Izod—Izod shock resistance, notched, according to ASTM standard D 256-56, expressed in Joules/meter (J/m), Mooney—Mooney viscosity ML (5+5) measured at 177° C., HDT—Deformation temperature under pressure (HDT) under 18.5 daN, measured according to ASTM standard D 648-58 T and expressed in degrees Celsius, Tensile strength—Threshold tensile strength according to ASTM standard D 638-64 T and expressed in M Pa (Mega Pascal), Hardness—Rockwell hardness R according to ASTM standard D 785-65, Brightness—The brightness (luster) measurements are carried out on small plates formed by injection with a piston press under a pressure of 70 bars and at a temperature of 250° C., using a Lange Universal Messgerat brightness meter operating by reflection at an incidence of 45° and calibrated prior to each measurement so that a square of a black and shiny ceramic gives the value of 100.

In all of the examples, the process was carried out in one and the same reactor of 16-liter capacity, which was equipped with a temperature regulating means which could regulate the temperature between 30° and 140° C., and provided with an agitator whose rotational speed could be varied between 60 and 500 RPM. The reactor was designed to withstand internal pressures below 15 bars and was equipped with several orifices permitting various additions of material. Several dosing pumps as well as several pressure lock chambers designed to resist high pressures could fit onto this reactor.

In all of the examples, the amounts of products used are expressed as parts per weight relative to 100 parts per weight of graft copolymer and comparative examples 1, 2 and 3 are not part of the scope of the invention, but are given solely for the sake of comparison and for the purpose of defining the limits of the invention and showing its advantages.

EXAMPLE 1

In this example, the reaction medium was placed into suspension without first having carried out an emulsion polymerization.

The characteristics of the latex used (Latex I) are:

| LATEX I | |
| --- | --- |
| Latex Designation | Monodimensional polybutadiene |
| Dry solids | 42.1% |
| $D_n{}^*$ (mean diameter by number) | 2,000 A |
| $D'_p{}^*$ (mean diameter by weight) | 2,050 A |
| Mooney viscosity** | 220 |
| Gel ratio | 87.9% |
| Swelling index | 14.2% |

| LATEX I | |
|---|---|
| Stabilizer (Potassium laurate) | 1.8% |

**Mooney: ML (1 + 4) at 100° C.

$^*D_n = \frac{\Sigma ni\ di}{\Sigma ni}$ $^*D'_p = \left(\frac{\Sigma ni\ di^3}{\Sigma ni}\right)^{\frac{1}{3}}$ The grafted copolymer which has been prepared contained 50% polybutadiene, 38% styrene, and 12% acrylonitrile.

The reactor was loaded with 50 parts of latex, calculated as dry solids (dry extract). The dilution was adjusted in such a way that the total amount of water, including the water of the latex, amounts to 160 parts. There was then introduced a solution of 0.5 parts of potassium persulfate in 5 parts of water, followed by a mixture containing 38 parts of styrene, 12 parts of acrylonitrile, 0.4 parts of tertiododecyl mercaptan, 1.5 parts of trinonyl phenyl phosphite, and 0.2 parts of t-butyl perpivalate. There was then added 1.5 parts of polyvinyl alcohol in solution in 50 parts of water. The reactor was closed, the mixture agitated at 250 RPM, and heated at 60° C. for 10 hours.

After cooling, a fine powder was obtained, which was washed, centrifuged, and dried.

The mechanical properties of two of the Types were measured and the results were:

| Type 1: | |
|---|---|
| Izod | 310 J/m |
| Tensile strength | 27.3 MPa |
| Hardness | 79 |
| Mooney | 44 |
| HDT | 95° C. |
| Brightness | 22 uneven and dull |
| Type 2: | |
| Izod | 60 J/m |
| Tensile strength | 36.5 MPa |
| Hardness | 106 |
| Mooney | 23 |
| HDT | 95.2° C. |
| Brightness | 51 uneven and dull surface appearance |

This test shows that placing the reaction medium into suspension as soon as the reaction is started, that is to say without an adequate grafting stage in emulsion, leads to graft copolymers which only yield products having an uneven and dull surface appearance, low Rockwell hardness, low tensile strength, satisfactory Mooney viscosity and a relatively high Izod shock resistance for the type which is rich in graft copolymer, but a relatively low Izod shock resistance for the type which is poor in graft copolymer.

EXAMPLE 2

In this example, the reaction medium was placed into suspension at a time when the grafting by polymerization in emulsion is still insufficient.

The characteristics of the latex used are:

| LATEX II | |
|---|---|
| Latex Designation | Monodimensional polybutadiene |
| Dry extract | 32% |
| $D_n$ | 2,000 A |
| $D_p'$ | 2,040 A |
| Mooney viscosity | 210 |
| Swelling index | 15.8 |
| Gel ratio | 86.1% |
| Stabilization | 1.3% sodium laurate |

A graft copolymer was prepared which contained 50% polybutadiene, 38% styrene, and 12% acrylonitrile.

The reactor was loaded with the 50 parts of polybutadiene, calculated as dry solids. The dilution was adjusted to provide 150 parts of water, including the water of the latex. Agitation was carried out at 80 RPM and the mixture heated to 62° C. At 62° C., there was introduced a solution of 0.5 parts potassium persulfate in 10 parts of water and then there was started a continuous feeding of a mixture of 12.7 parts styrene and 4 parts acrylonitrile, which was totally introduced into the reactor during one hour of reaction at 60° C. A sample taken at that moment yielded a dry solids content of 27.9%.

With the use of the pressure lock chamber, there was then added a mixture of 25.3 parts of styrene, 8 parts of acrylonitrile, 0.3 parts of tertiododecyl mercaptan, 1 part of trinonyl phenyl phosphite and 0.2 parts of t-butyl perpivalate. The agitation was raised to 250 RPM and 2 parts of polyvinyl alcohol (Polyviol 40/140) in solution in 100 parts of water added using a pressure lock chamber. The medium was kept under agitation at 60° C. for 10 hours. The copolymer was then recovered under the customary conditions.

The mechanical properties were measured on Type 1 and were as follows:

| Type 1: | |
|---|---|
| Izod | 480 J/m |
| Tensile strength | 32.0 MPa |
| Hardness | 93 |
| Mooney | 56 |
| HDT | 94° C. |
| Brightness | 41 dull surface appearance |

The 27.9 dry extract measured at the end of emulsion grafting corresponds to a conversion ratio of 80% of the monomers present and having been effectively introduced in emulsion. The xy/z ratio having previously been defined amounts to $$\frac{(12.7 + 4)}{50} \times 80\% = 26.8\%.$$

The emulsion grafting is insufficient and it can be seen that the product has a high resilience, but a clearly insufficient brightness.

EXAMPLE 3

In this example, the graft copolymer was prepared solely by emulsion polymerization. The latex used was identical to that of Example 1, but not stabilized.

The graft copolymer, which has been prepared, contained 50% polybutadiene, 38% styrene and 12% acrylonitrile. The reactor was loaded with the 50 parts of polybutadiene, calculated as dry solids and the dilution adjusted with 180 parts of water. The mixture was heated to 62° C., while agitation took place at 80 RPM. At this temperature, there was introduced a solution of 0.5 parts of water, and simultaneously there was started a continuous addition of the monomers and a continuous addition of 2.5 parts of colophony (rosin) salt in 35 parts of water, while maintaining the temperature at 60° C. These two continuous additions lasted 4 hours. The mixture of monomers added consisted of 38 parts of styrene, 12 parts of acrylonitrile and 0.35 parts of tertiododecyl mercaptan. The reaction was carried out at 60° C. for 6 hours. The graft copolymer was then flocculated with the help of a solution of magnesium sulfate and subsequently dried and mixed with some rosin in order to yield Type 1.

The mechanical properties obtained on Type 1 were as follows:

| Type 1: | |
|---|---|
| Izod | 120 J/m |
| Tensile Strength | 37.0 MPa |
| Hardness | 95 |
| Mooney | 45 |
| HDT | 96° C. |
| Brightness | 93 smooth and shiny surface appearance |

The product obtained clearly possessed an insufficient Izod shock resistance. Moreover, the residual styrene at the end of reaction amounted to 0.7% and the residual moisture prior to drying amounted to 43%.

The examples which follow enter into the scope of the polymerization method according to the invention.

In these examples, for the products containing 50% of elastomer, the average (mean) moisture ratio before drying is of the order of 22% and the residual monomers amount to less than 0.1%.

EXAMPLE 4

In this example, a series of six copolymers of the acrylonitrile/butadiene/styrene type (ABS) were prepared using different latexes and varying proportions.

The characteristics of the latexes used are set forth in the following Table.

| Latex | Latex I | Latex III | Latex IV | Latex V |
|---|---|---|---|---|
| Latex Designation* | Polybutadiene | Polybutadiene | Styrene/Butadiene | Polybutadiene |
| Dry Extract | 42.1% | 33% | 41% | 36% |
| $D_n$ | 2,000 A | 1,000 A | 1,100 A | 850 A |
| $D_p'$ | 2,050 A | 1,030 A | 1,120 A | 872 A |
| Mooney | 220 | 120 | 196 | 70 |
| Gel ratio | 87.9% | 92.7% | 90.9% | 75.4% |
| Swelling index | 14.2 | 10.6 | 12.8 | 18.2 |
| Stabilization | Potassium laurate 1.8% | Potassium laurate 1.2% | Sodium laurate 1.5% | Potassium laurate 1.3% |

*All Latexes are monodimensional

Table I which follows shows the formulations for each of the six different tests with the latex A weight expressed in weight of dry solids; the reference letter of the latex used being given in parentheses in Table I next to the weight. In each test the noted amount of latex was loaded into the reactor and the dilution adjusted in such a way that the total amount of water, including the water contributed by the latex, is that set forth in Table I for each test.

For each test the agitation in the reactor was raised to 80 RPM and the reaction medium heated to 62° C. The noted amount of potassium persulfate dissolved in 10 parts of water was added. The temperature was adjusted to 60° C. and continuous feeding of the following mixture in the amounts noted started: styrene, acrylonitrile, and tertiododecyl mercaptan (TDM). This continuous addition carried out by means of a dosing pump was regulated at such a delivery rate that all of the mixture was introduced into the reaction medium in the time noted. In each case, when the continuous addition was terminated, a dry extract determination was carried out on a sample of the graft latex. This dry extract (dry solids) value was used in the calculation of the xy/z ratio. With the use of a pressure lock chamber, there then was introduced Latex B, the reference letter of the latex being given in parentheses in Table I, whose dilution had previously been adjusted in such a way to give the total amount of water set forth for each test. Then likewise by means of a pressure lock chamber there was introduced styrene, acrylonitrile, TDM, antioxidant of the phosphite type, t-butyl perpivalate, lauroyl peroxide and t-butyl perbenzoate, in each test in the amounts noted in Table I.

The agitation was raised to 300 RPM and through another pressure lock chamber there was introduced polyvinyl alcohol (PVA) dissolved in water. Then, still under agitation, the suspension cycle indicated in Table I was carried out. Cooling then took place and the reactor was emptied. The beads were washed with water, centrifuged, and then dried in a drying oven. The mechanical properties of the mixtures are shown in Table II.

TABLE I

| Test | 4(a) | 4(b) | 4(c) | 4(d) | 4(e) | 4(f) |
|---|---|---|---|---|---|---|
| Latex A | 40(I) | 40(I) | 40(I) | 37.5(I) | 37.5(III) | 55.2(IV) |
| Water | 120 | 120 | 120 | 112.5 | 112.5 | 165 |
| $K_2S_2O_8$ | 0.3 | 0.5 | 0.4 | 0.38 | 0.45 | 0.32 |
| Styrene | 30.4 | 38 | 36 | 28.5 | 30.4 | 27.3 |
| Acrylonitrile | 9.6 | 12 | 10 | 9 | 9.2 | 8.7 |
| TDM | 0.4 | 0.5 | 0.5 | 0.38 | 0.25 | 0.1 |
| Duration (hours [h] and minutes [mn]) | 3 h | 3 h | 4 h | 2 h 30mn | 3 h 30mn | 3 h |
| Latex B | 10(I) | 10(III) | 10(IV) | 12.5(V) | 12.5(V) | 4.8(V) |
| Water | 30 | 30 | 30 | 66 | 66 | 14 |
| Styrene | 7.6 | — | 2 | 5.5 | 7.6 | 3.1 |
| Acrylonitrile | 2.4 | — | 2 | 3 | 2.8 | 0.9 |
| TDM | 0.1 | — | 0.1 | 0.12 | 0.25 | 0.3 |
| Antioxidant | 1 | 1 | 1.5 | 1 | 0.8 | 0.85 |
| Perpivalate | 0.2 | — | 0.2 | — | 0.2 | — |

TABLE I-continued

| Test | 4(a) | 4(b) | 4(c) | 4(d) | 4(e) | 4(f) |
|---|---|---|---|---|---|---|
| Lauroyl peroxide | — | 0.2 | 0.2 | 0.15 | 0.2 | 0.3 |
| Perbenzoate | — | — | 0.1 | 0.2 | 0.05 | 0.1 |
| PVA | 2 | 2 | 1.5 | 1.2 | 0.95 | 2 |
| Water (To dissolve PVA) | 75 | 75 | 75 | 50 | 50 | 50 |
| Suspension Cycle | 60° C. 8 h | 80° C. 6 h | 60° C. 3 h 80° C. 3 h 110° C. 2 h | 80° C. 4 h 110° C. 3 h | 60° C. 3 h 80° C. 2 h 120° C. 2 h | 80° C. 2 h 120° C. 3 h |
| Dry Extract | 35.9% | 38.4% | 37.8% | 36.5% | 36.6% | 31.2% |
| Conversion Ratio | 85% | 90% | 91% | 93% | 90% | 77.7% |
| $\frac{xy}{z}$ % | 85% | 112.2% | 105% | 93% | 95.5% | 50.7% |

TABLE II

| Test | 4(a) | 4(b) | 4(c) | 4(d) | 4(e) | 4(f) |
|---|---|---|---|---|---|---|
| Type 1: | | | | | | |
| Izod (J/m) | 340 | 360 | 380 | 420 | 480 | 440 |
| Mooney | 44 | 51 | 42 | 43 | 46 | 54 |
| Brightness | 84 | 89 | 83 | 89 | 88 | 80 |
| HDT (°C.) | 96 | 95 | 95.5 | 95 | 96.2 | 95 |
| Tensile Strength (MPA) | 36.0 | 36.0 | 35.2 | 33.4 | 33.9 | 32.5 |
| Hardness | 95 | 95.4 | 95 | 96.3 | 97.6 | 92 |
| Type 2: | | | | | | |
| Izod (J/m) | 170 | 160 | 180 | 220 | 250 | 230 |
| Mooney | 24 | 28 | 22 | 24 | 26 | 28 |
| Brightness | 89 | 90 | 90 | 95 | 97 | 84 |
| HDT (°C.) | 96.5 | 96 | 96 | 95.5 | 97 | 95 |
| Tensile Strength (MPa) | 47.5 | 48.2 | 47.7 | 44.7 | 44.2 | 43.0 |
| Hardness | 111.7 | 112.2 | 112 | 113.4 | 113.6 | 112 |
| Type 3: | | | | | | |
| Izod (J/m) | 180 | 200 | 220 | 250 | 280 | 260 |
| Mooney | 74 | 78 | 75 | 75 | 79 | 85 |
| Brightness | 86 | 87 | 86 | 89 | 91 | 80 |
| HDT (°C.) | 111.5 | 113 | 112.5 | 114 | 114 | 112.5 |
| Tensile Strength (MPa) | 47.0 | 47.4 | 48.0 | 46.0 | 45.8 | 44.0 |
| Hardness | 111.8 | 111 | 113 | 114 | 114.5 | 112 |

EXAMPLE 5

In this example there was prepared a graft copolymer of the methyl methacrylate/butadiene/styrene type (MBS).

For this purpose, the reactor was loaded with 40 parts of Latex III of Example 4, expressed in the form of dry solids. Agitation was carried out at 80 RPM and the dilution adjusted so that the total water content represents 120 parts. The mixture was heated to 65° C. and at 65° C. there was introduced a solution of 0.4 part of potassium persulfate in 8 parts of water and continuous feeding for a total duration of 3 hours started of a mixture composed of 28 parts of methyl methacrylate, 12 parts of styrene, and 0.2 parts of tertiododecyl mercaptan. When the continuous addition had been terminated, a dry solids determination is carried out which then amounted to 36%, corresponding to a conversion ratio of 88%, with the xy/z ratio being equal to 88×(40/40)=88%. By means of a pressure lock chamber there was then introduced 10 parts of Latex V of Example 4 diluted so that the total water content represented 30 parts, followed by a mixture of 7 parts of methyl methacrylate, 3 parts of styrene, 0.3 parts of lauroyl peroxide, and 1 parts of antioxidant of the phosphite type. The temperature was raised to 80° C., the reaction medium agitated at 350 RPM, and then a solution of 1.1 parts of polyvinyl alcohol dissolved in 100 parts of water introduced. The temperature was kept at 80° C. for 5 hours.

The beads of graft polymer were washed with lukewarm water, centrifuged and then dried.

This graft copolymer is mixed in such a way that the final mixture will contain 20% of polybutadiene with a methyl methacrylate/styrene copolymer containing 70% of methyl methacrylate by weight and 30% of styrene by weight and having an intrinsic viscosity of 0.5 dl/g as measured in dimethyl formamide.

This mixture when injected at 175° C. under a pressure of 120 bars possesses the following mechanical properties:

| Izod | 250 | J/m |
|---|---|---|
| Mooney | 45 | |
| Brightness | 83 | |

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. The method of making graft copolymers by the polymerization of a monomeric mixture comprising at least one aromatic vinyl compound and at least one acrylic or methacrylic compound in the presence of a graftable monodimensional elastomer latex containing ethylenic double bonds, comprising the steps of first carrying out the polymerization under aqueous emulsion polymerization conditions in the presence of an initial amount of a first graftable monodimensional elastomer latex containing ethylenic double bonds that is a major portion of the latex entering into the composition of the graft copolymer until the xy/z ratio is greater than 30%; x being the total parts by weight of said monomers, y the conversion coefficient of said monomers expressed in percent of total amount, and z the total amount of elastomer expressed in parts by weight of dry solids, and thereafter adding the remaining amount of a second graftable monodimensional elastomer latex containing ethylenic double bonds and completing the polymerization reaction under suspension polymerization conditions, said first and second latexes being the same or different.

2. The method of claim 1 wherein the means diameter of the particles of the graftable monodimensional elastomer latexes ranges between about 300 and 3,000 Angstroms.

3. The method of claims 1 or 2 wherein 60 to 95% the total weight of said first and second graftable monodimensional elastomer latexes is added during the initial emulsion polymerization.

4. The method of claims 1 or 2 wherein the gel ratio of said second graftable monodimensional elastomer latex is from 80 to 95% for a swelling index of about 8 to 18 and said first latex and said second latex are the same.

5. The method of claims 1 or 2 wherein the gel ratio of said second graftable monodimensional elastomer latex is from 40 to 80% for a swelling index of about 15 to 40 and said first latex and said second latex are different.

6. The method of claim 5 wherein the gel ratio of said first graftable monodimensional elastomer latex has a gel ratio of from 80 to 95% for a swelling index of about 8 to 18.

7. The method of claims 1 or 2 wherein said first and second graftable monodimensional elastomer latexes are a polybutadiene or a styrene-butadiene copolymer.

8. The method of claim 7 wherein the styrene-butadiene copolymer has a styrene content below about 20% by weight.

9. The method of claim 7 wherein the total amount of said first and second graftable monodimensional elastomer latexes used is such as to form graft copolymers containing 10 to 70% by weight of elastomer.

10. The method of claims 1 or 2 wherein the mixture of monomers consists of styrene and acrylonitrile or styrene and methyl methacrylate.

11. The method of claim 1 wherein said first and second graftable monodimensional elastomer latexes are polymers selected from a polyisoprene, a polychloroprene, a polybutadiene, a styrene-butadiene copolymer, an acrylonitrile-butadiene copolymer, or copolymers with an ethylene, propylene, or isobutylene base; said aromatic vinyl compound is selected from styrene, α-methyl styrene, o-methyl styrene, m-methyl styrene, p-methyl styrene, dimethyl styrenes, halogenated styrenes, and mixtures thereof; and said acrylic or methacrylic compound is selected from acrylic acid, methacrylic acid, methyl acrylate, ethyl acrylate, butyl acrylate, methyl methacrylate, ethyl methacrylate, butyl methacrylate, acrylonitrile, methacrylonitrile, and mixtures thereof.

12. The method of claim 11 wherein the mean diameter of the particles of said first and second graftable monodimensional elastomer latexes ranges between about 500 and 2,500 Angstroms; 70 to 90% of the total weight of said first and second graftable monodimensional elastomer latexes is added during the initial emulsion polymerization; the proportions of monomers and elastomers adjusted to give graft copolymers containing 40 to 60% by weight of elastomer; and the initial emulsion polymerization carried out until the xy/z ratio is greater than 40%.

13. The method of claims 11 or 12 wherein the emulsion polymerization is carried out under agitation at a temperature of from about 40° to 80° C. and the suspension polymerization is carried out under agitation at a temperature of from about 60° to 120° C.

14. The method of claim 13 wherein said first graftable monodimensional elastomer latex is stabilized with an emulsifier prior to initiation of the initial emulsion polymerization.

* * * * *